United States Patent [19]
Farrell

[11] Patent Number: 5,032,077
[45] Date of Patent: Jul. 16, 1991

[54] INJECTION BLOW MOLDING MACHINE
[75] Inventor: John J. Farrell, Greenbrook, N.J.
[73] Assignee: BM Corp., Sommerville, N.J.
[21] Appl. No.: 468,066
[22] Filed: Jan. 22, 1990
[51] Int. Cl.$^5$ .............................................. B29C 49/06
[52] U.S. Cl. .................... 425/533; 156/583.6; 264/538; 425/534; 425/540
[58] Field of Search ............... 425/522, 528, 533, 534, 425/538, 539, 540, 46; 264/538; 156/583.6

[56] References Cited
U.S. PATENT DOCUMENTS

| | | | |
|---|---|---|---|
| 3,832,101 | 8/1974 | Rainville | 425/242 B |
| 3,847,520 | 11/1974 | Plum Hans | 425/46 |
| 3,877,859 | 4/1975 | Grazine | 425/534 |
| 3,943,219 | 3/1976 | Aoki | 425/533 |

Primary Examiner—Heitbrink Timothy
Attorney, Agent, or Firm—Marvin Feldman

[57] ABSTRACT

An injection blow molding machine construction utilizes pairs of C-shaped cut plate members to support clamps for the injection mold and for the blow mold, respectively. The injection molding frame members are angularly disposed at 60 degrees with respect to the blow molding frame members. The frame members are co-mounted at the ends of the C-shaped members to a pre-stressed central vertically disposed column or post. The respective injection mold and blow mold clamp forces are transmitted to the respective frame members and in turn to the column in a balanced manner to avoid flexure of the plate members. The present construction reduces the bulk of conventional injection blow molding machines, eliminates weldments and provides for ready assembly for the machine and ready access to the molds so as to reduce downtime.

14 Claims, 5 Drawing Sheets

INJECTION BLOW MOLDING MACHINE

FIELD OF THE INVENTION

This invention relates to a construction for a molding machine, and specifically for an injection or injection blow molding machine.

BACKGROUND OF THE INVENTION

The forces required to hold molds closed may be considerable. This is particularly so in an injection mold where the force in the injection mold cavity produced by the molten plastic may exert a pressure of several thousand pounds per square inch. This force is transmitted to and has to be maintained by the frame supporting the mold clamps and molds.

The construction of molding machines, particularly including injection molding machines, thus required bulky frame members with a substantial member of welds. Such massive prior art constructions were costly to manufacture, and made access to the molds difficult so that there was excessive downtime.

In the Jomar Injection Blow Molding Machine, produced by Jomar Industries, Inc., Brigantine, New Jersey 08203, a massive frame was required to support the injection mold clamp and the blow mold clamp. Certain clamp forces were generated outside the confines of the frame thus tending to cause undue stress and deflection or deformation in the frame. Further, access to the molds was difficult with excessive downtime in the maintenance and changing of the molds.

A more balanced control of the mold clamping forces was achieved by the three-station or delta construction, such as is shown and described in U.S. Pat. No. 3,847,520, granted Apr. 15, 1975 to Grazine. This construction, however, was bulky and required three support posts and numerous weldments.

The art desired a simplified, compact (i.e. minimal floor space) construction, which is readily manufactured and assembled, and yet one capable of withstanding the clamp forces exerted during the injection molding operations. Further, the art desired an injection blow molding machine which provided ready access to the molds.

SUMMARY OF THE INVENTION

Pairs of C-shaped cut metal plates are used to mount the injection mold clamps and blow mold clamps, respectively. The pairs of plates are bolted to a prestressed vertically disposed central support post or column, with the respective pairs of plates being disposed at about 60 degrees to one another. The plates and column support the mold clamps and take up the mold clamp reaction forces in a balanced manner. The inside bottom cut edges of the plates support a table. The injection and blow molds are supportably mounted on the table. Each plate is cut and angularly disposed so as to provide ready access to the molds so as to reduce the downtime during mold change or repair. The pairs of plates are bolted at the ends of the C-shape to plates which receive the central post. The plates and column are mounted by bolts so as to eliminate the need for weldments in assembly. Relatively unskilled workers are thus able to assemble the machine.

The frame construction of the present invention is particularly suited for a 3-station injection blow molding machine, where the first station is the injection molding station centrally disposed to a first pair of support plates, and the second station is a blow molding station centrally disposed to a second pair of support plates and disposed 60 degrees from the first pair of support plates, and the third station is a blow molded article stripping station. Each station is disposed 120 degrees from each of the other stations The C-shape angular configuration provides for minimal floor space with ready access to the molds.

DESCRIPTION OF THE PREFERRED EMBODIMENTS

Figure 1:
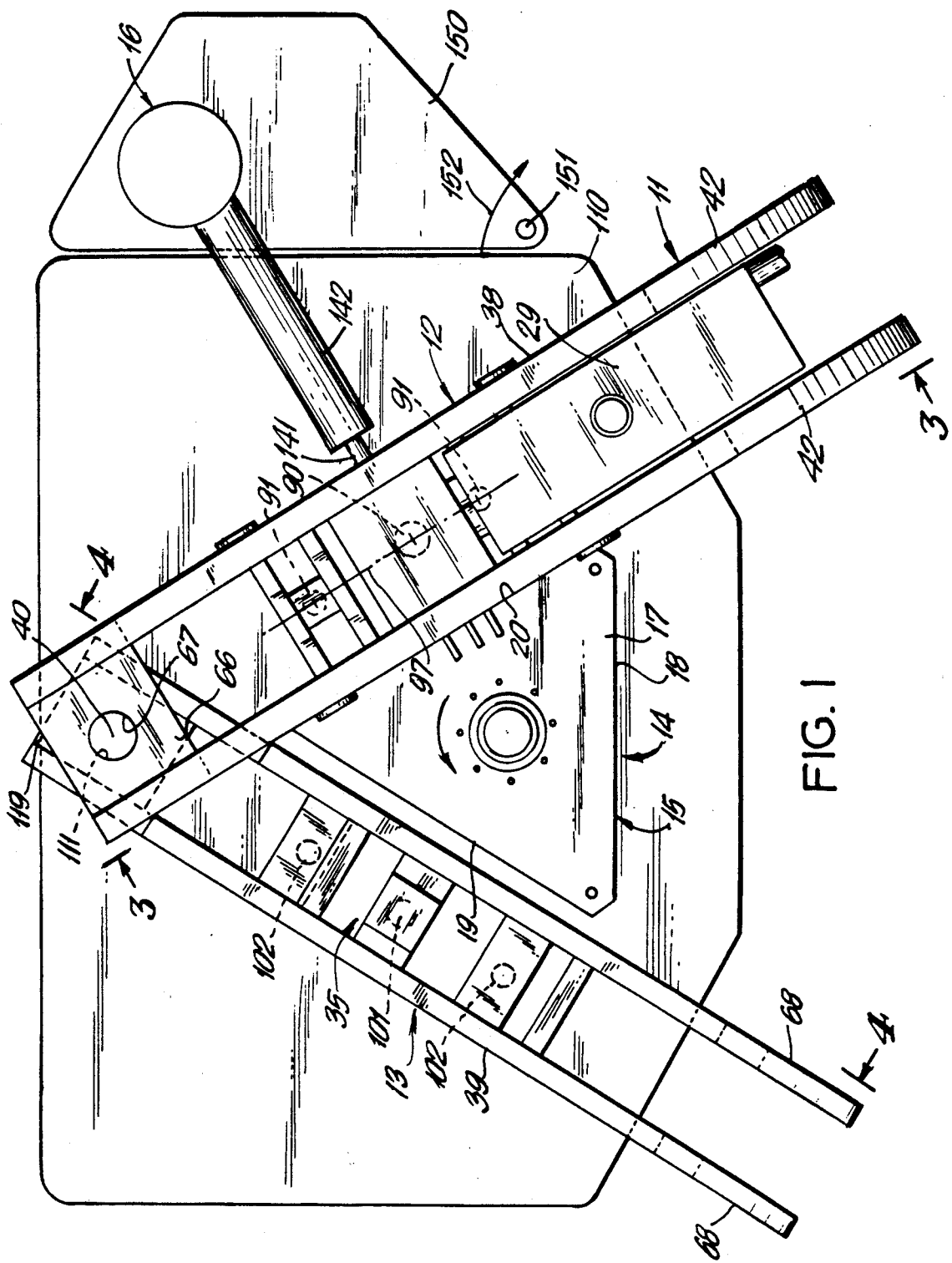
FIG. 1 is a top plan view of an injection blow molding machine embodying the present invention.

Referring to the FIGURES there is shown the injection blow molding machine 10 embodying the present invention. Injection blow molding machine 10, in general terms, is composed of frame construction 11, injection molding station 12, blow molding station 13, stripping station 14, indexable core rod unit 15 and screw plasticizer assembly 16. Indexable core rod unit 15 is formed of a triangular head 17 having three vertical faces 18, 19 and 20. A like number of core rods 21 are mounted to and extend horizontally outward from each face 18-20. An indexing mechanism rotates the core rods 21 in a stepwise manner from injection molding station 12 to blow molding station 13 and then to stripping station 14, which indexing cycle is repeated for each injection blow molding cycle. The core rod indexing unit 15 is of conventional design, construction and operation.

The injection molding station 12 includes an injection mold 23 having a movable upper platen 24 and a fixed lower platen 25. Each platen is provided with mold cavity portions 26 and 27, so that with platens 24 and 25 closed, each core rod 21 is disposed within an injection cavity as is well known in the art. Injection mold clamp mechanism 29 is bolted to frame 11 and operably connected to upper platen 24. The blow molding station 13 includes a blow mold 28 having a movable upper platen 30 and a fixed lower platen 31. Each platen is provided with mold cavity portions 32 and 33, respectively. With the platens 30 and 31 closed, each core rod 21 is disposed in a blow mold. Blow mold clamp mechanism 35 is operably connected to upper blow mold platen 30. A rocker arm mechanism 36 is connected at hinge 37 to upper injection mold platen 24 to provide for the centering of the core rods 21 between the mold platens, in the known manner. The construction and operation of the injection and blow molds is well known in the art. The arrangement and mounting of the injection mold clamp mechanism 29 and the blow mold clamp mechanism 35 in combination with the mold frame design and construction is one aspect of the present invention and will be more fully discussed hereinafter.

Figure 2:
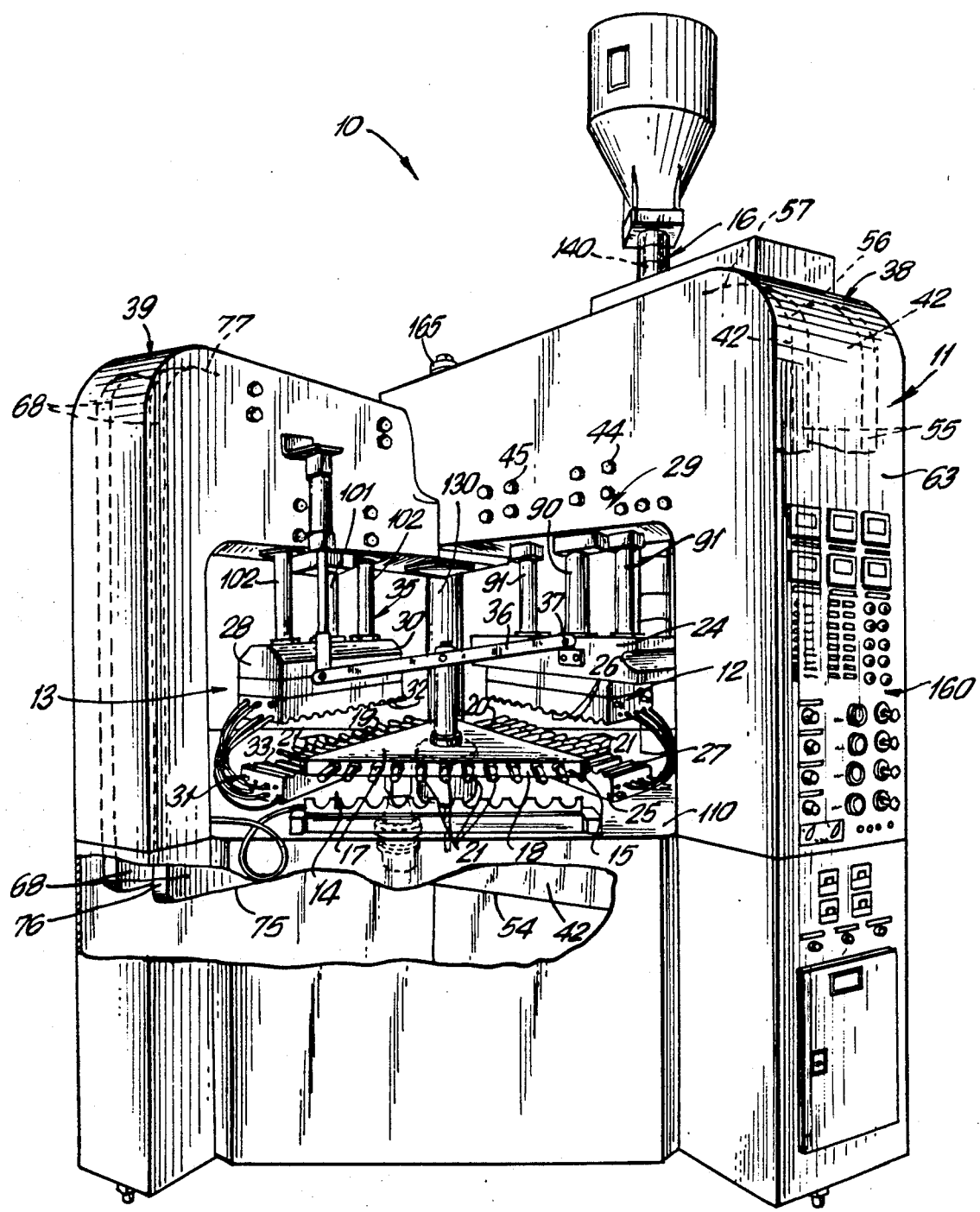
FIG. 2 is a front perspective partial fragmentary view of the machine of FIG.1 with the molds shown in the open position.
Figure 3:
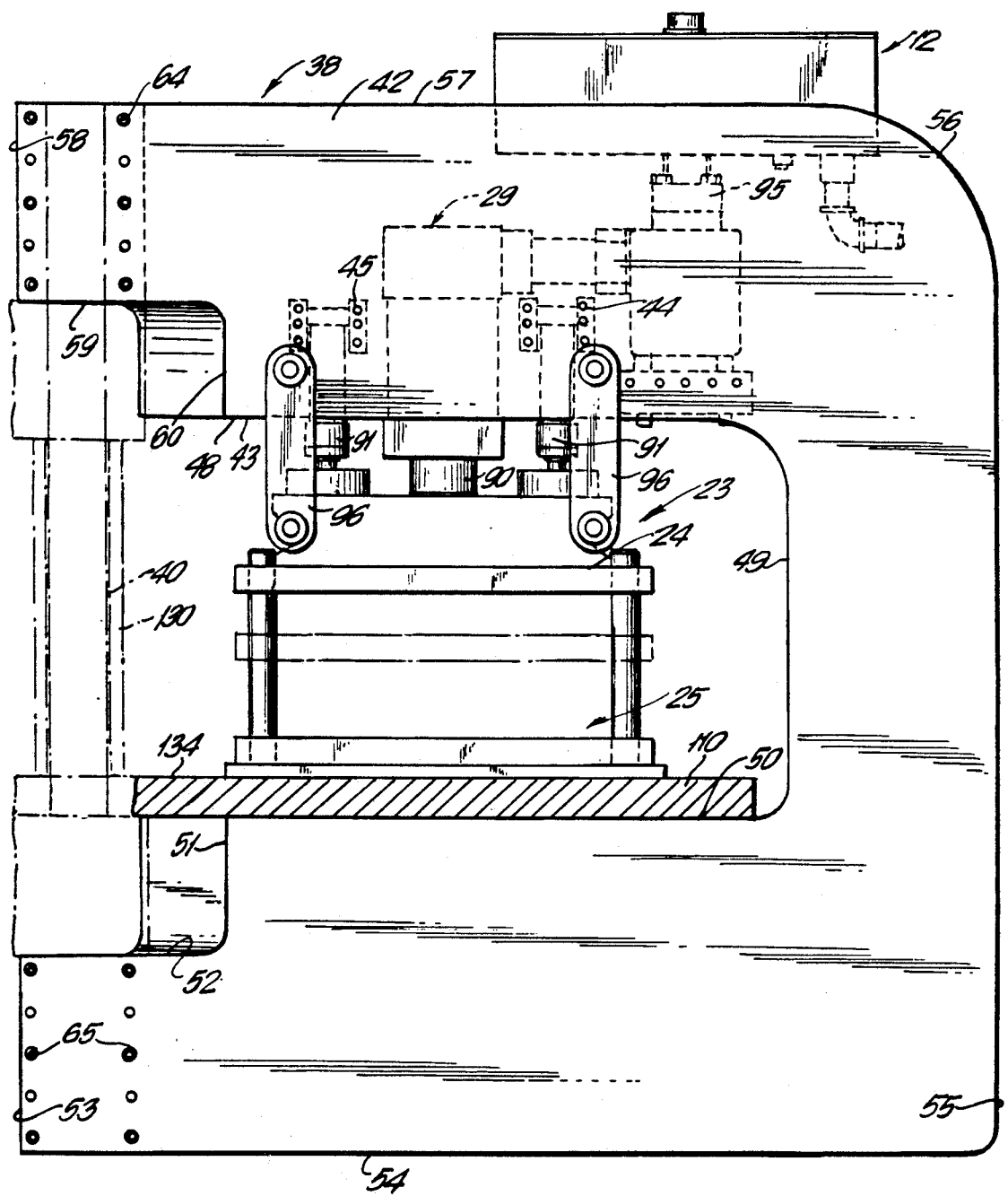
FIG. 3 is a partial sectional view taken along line 3—3 of FIG.1.
Figure 4:
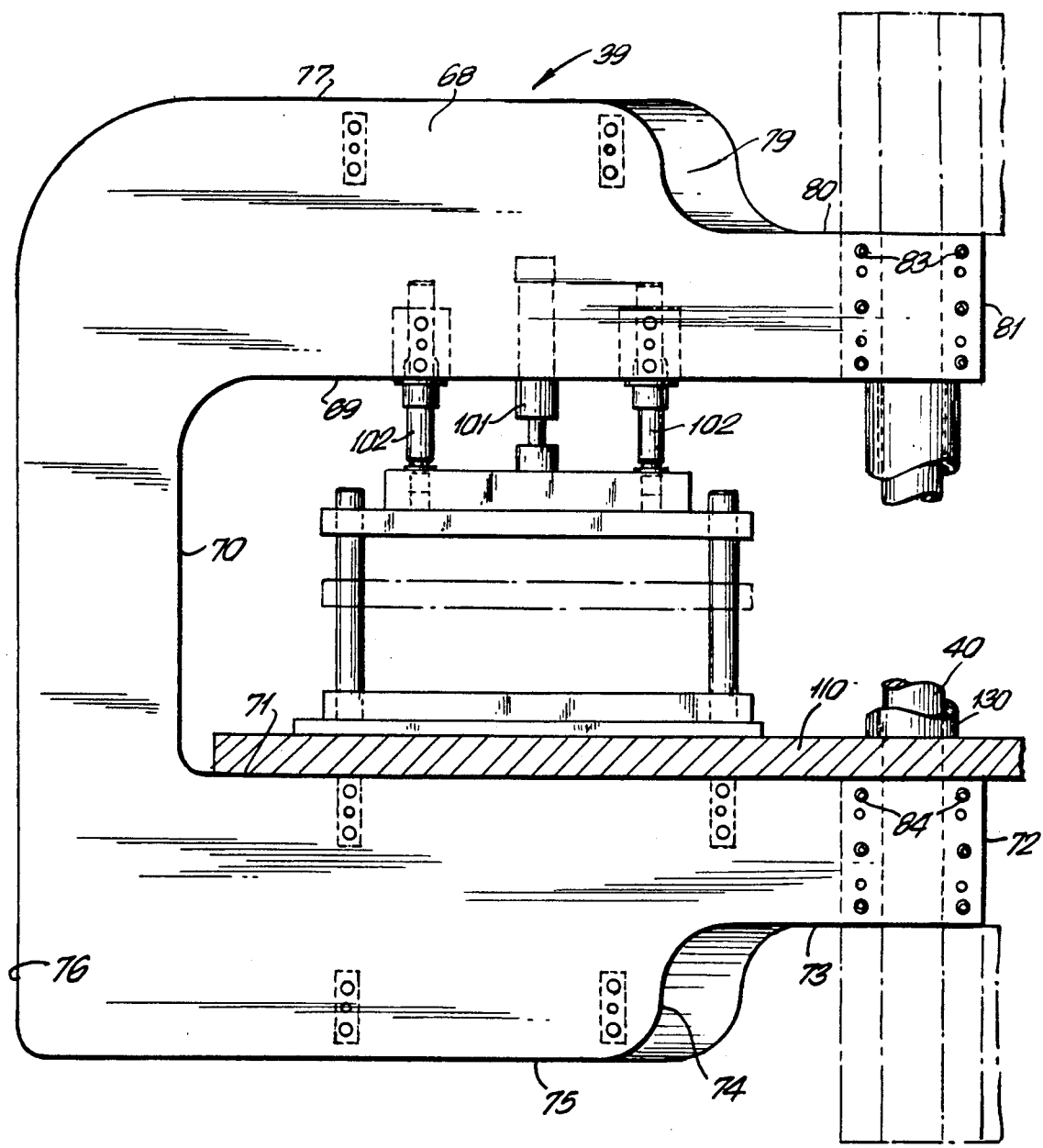
FIG. 4 is a partial sectional view taken along line 4—4 of FIG.1.

Frame construction 11 is formed of injection mold frame 38 and blow mold frame 39 which are disposed at 60 degrees to each other. Frames 38 and 39 are mounted to central, vertically disposed, pre-stressed post or column 40. Frame 38 is formed of a pair of C-shaped flame-cut frame members 42. Members 42 are vertically disposed and are in parallel disposition. Injection mold clamp mechanism 29 is centrally disposed between frame members 42 and is bolted to frame members 42 as at 44 and 45. Members 42 are formed with C-shaped cut edges 48 having an upper horizontal portion 43, a front vertical portion 49, a bottom horizontal portion 50 oppositely disposed to upper portion 43, lower vertical edge portion 51 and horizontal lower edge portion 52, lower back edge portion 53, floor edge portion 54, vertical front edge portion 55. curved or contoured edge portion 56, top portion 57, top back edge portion 68, top back horizontal portion 59 and rear vertical portion 60 which in turn meets upper horizontal portion 43 to complete the C-shape of frame member 42. The front edges 55 of frame members 42 may be covered with a cover or face plate 63 (FIG. 2). Face plate 63 is bolted to frame members or plates 42. Plates 42 are formed with upper bolt holes 64 and lower bolt holes 65. Plate or block 66 is mounted between frame members 42, and is provided with central hole 67 (FIG. 1).

Blow mold frame 39 is formed of a pair of C-shaped flame-cut frame members 68. Members 68 are vertically disposed and are in parallel disposition. Blow mold clamp mechanism 35 is centrally disposed between members 68. Each member 68 is formed with an upper inside edge portion 69, a front vertical edge portion 70, a lower inside horizontal edge portion 71, bottom rear portion 72, lower bottom portion 73, contoured portion 74, bottom edge portion 75, front edge portion 76, horizontal edge 77, curved or contoured edge portion 79, top edge 80, top back edge 81 which completes the contiguous edge structure at edge portion 69. Referring to FIG. 2-5, edges 79 and 80 and 73 and 74 of frame members 68 flash mate to frames 42. Specifically, edge 80 of frame 68 abuts edge 59 of frame 42, and edge 73 of frame 68 abuts edge 52 of frame 42. Edges 74 and 79 of frame 68 abuts frames 42 (FIG. 1). In this manner, a flush assembly is provided. Frame members 68 are formed with upper bolt holes 83 and lower bolt holes 84. Plate or block 119 is bolt mounted between members 68 (FIG. 1).

Injection mold clamp mechanism 29 includes a central main piston 90 with auxiliary pistons 91 mounted equidistantly on opposite sides of the main piston 90. The lower ends of pistons 90 and 91 are fixedly mounted to movable upper mold platen 24. The upper ends of pistons 90 and 91 are operatively connected to hydraulic pre-fill assembly 95. A pair of hinged members 96 are connected at the upper ends to frame 42 and at the lower ends to upper platen 24 (See FIG. 3, not shown in FIG. 2). To close the injection mold, the pistons 90 and 91 are extended downwardly by hydraulic action. Hinged members 96 rotate to a vertically upright position to insure that the molds are securely closed. Rocker arm 36 moves downwardly at pivot 37, with closure of the injection mold, and the core rods 21 are disposed midway between upper platen 24 and lower platen 25. Rocker lever arm 36 has a 2:1 arm ratio so that the core rods 21 are vertically indexed one-half the distance of travel as the injection mold upper platen, in the well known manner.

It is important to note that center line 97 of pistons 90 and 91 is disposed midway between plates 42. In this manner of construction, the reaction clamp forces exerted by the pressure of the injected thermoplastic on the closed molds, are evenly transmitted to the frames 42 and in turn to the central column 40, as will be further discussed hereinafter. In a like manner, blow mold clamp mechanism 35 is formed of a central piston 101 and two auxiliary pistons 102 disposed equidistantly on opposite sides of piston 101. Pistons 101 and 102 are centrally disposed between plate frame members 39. This provides for the even distribution of the blow mold clamp forces. Insofar as the blow mold clamp forces are significally less than injection mold clamp forces, pistons 101 and 102 are of lesser hydraulic force design than pistons 90 and 91, and blow mold frame members 68 are substantially thinner than injection mold frame members 42.

The lower injection mold platen 25 and the lower blow mold platen 31 are mounted to table 110. Table 110 is in turn mounted on and supported on edges 50 of frames 42 and edges 71 of frames 68 respectively. Table 110 extends rearwardly and is formed with hole 111 to receive column 40.

Figure 5:
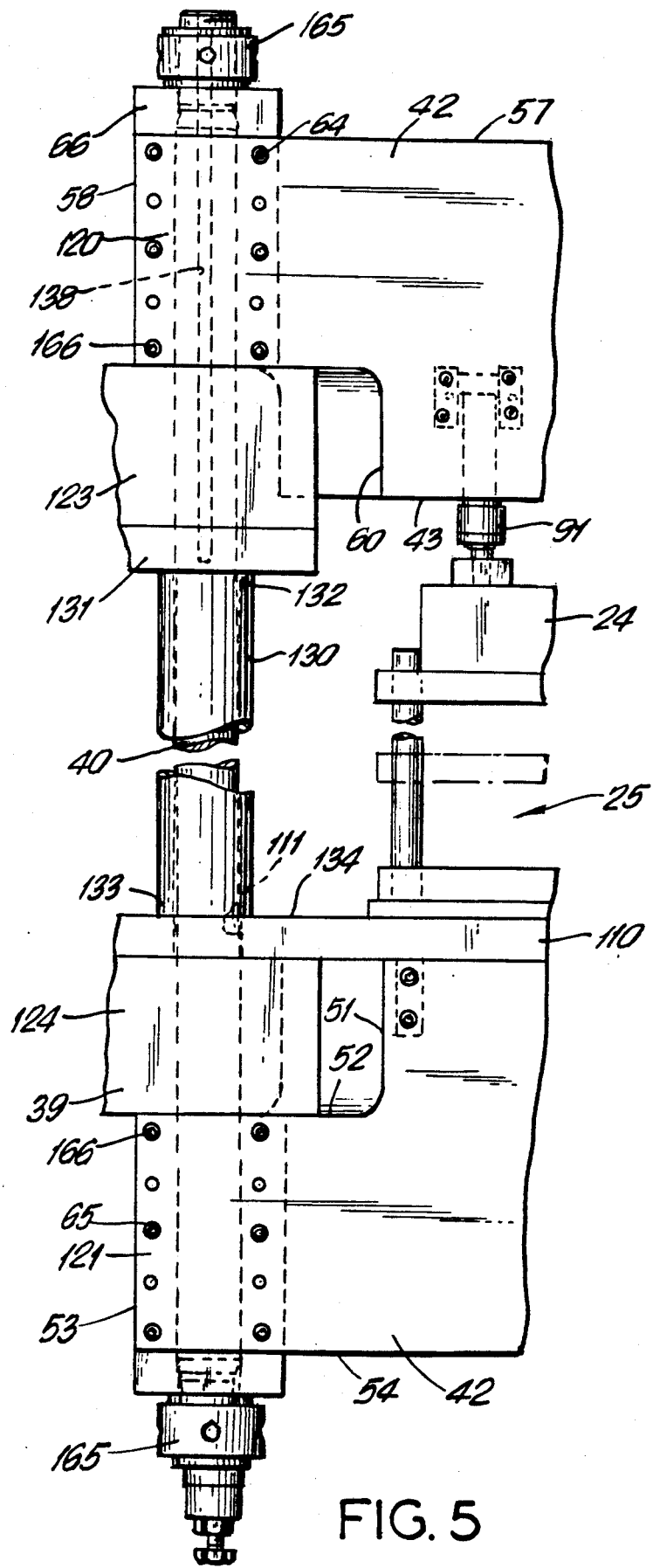
FIG. 5 is a detail fragmentary sectional view of the column assembly of FIG. 3.

Referring now specifically to FIG. 5, there is shown the upper end portion 120 and the lower end portion 121 of the C-shape of frames 42. Upper portions 123 and lower portions 124 of frames 39, are fit with portions 120 and 121 (partially shown) respectively. Column 40 is centrally disposed between frames 42 as well as between frames 68. Table 110 is formed in the hole 111 for receiving column 40. A tubular spacer 130 surrounds column 40 and at the top 132 abuts block 131 and at the bottom 133 abuts the top 134 of table 110. Spacer 130 maintains the integrity of the frame-column assembly. Block 66 is bolted between frame members 42, and has a central hole to receive column 40. The column 40, frames 42 and 68, spacer 130, and blocks 66 and 119 are assembled and when frames 42 and 68 are bolted 166 (typical) together, a flush integral assembly is constructed. Tie rod nuts 165 complete the integration of the assembly (FIG. 5).

Column 40 is pre-stressed and stress relieved. Column 40 is formed with central hole 138 to receive a heated fluid to stress the column to the desired degree in assembling column 40, spacer 130, table 110, blocks 66 and 119 within frames 42 and 68. This stresses the column and then permits rapid recovery of the mold clamping reaction forces. This in turn permits a rapid injection blow molding cycle. That is, with rapid recovery of the stresses in the column, the injection mold operation may be rapidly repeated. This is still another advantage of the present inventions.

Screw plasticizer assembly 16 is formed of two conventional units, namely vertical non reciprocating screw plasticizer 140 and horizontally disposed barrel 142 and nozzle 141. The vertical screw plasticizer assembly 16 may be of the type used in the Jomar injection blow molding machine (Jomar Industries, Inc., Brigantine, New Jersey 08203). Screw plasticizer assembly 16 is mounted on trapezoidal-shaped table 150 which is roller mounted (not shown) on the floor. Pivot bar 151 is vertically disposed and fixedly mounted so that table 150 with assembly 16, is free to rotate away from table 110. See arrow 152 in FIG. 1. In this manner of construction, an operator wishing to gain access to the injection mold for maintenance or mold change, may disconnect nozzle 155, and rotate table 150 away from table 110. The frame construction 42 then permits ready access to injection molding assembly 12.

The electrical control components may be conveniently mounted between frames 42. Control switches and guages 160 may be advantageously mounted on cover or face plate 63 (Frame 68 may also be provided with a face plate). This compact use of the space in combination with the compact arrangement provided by the frame construction and arrangement results in a high production machine with minimal floor space while providing ready access to the operating and control elements While the aforesaid description has been in relation to a 3-station injection blow molding machine, it is to be understood that the present invention is not limited to that type of machine or machine configuration. It is within the contemplation of the present invention to use the present station on any molding machine including injection molding machines and injection blow molding machines. The present invention may, for example, be used on multiple station or operation injection molding machines.

The preferred embodiment of the invention has been illustrated and described, but changes and modifications can be made and some features can be used in different combinations without departing from the invention as defined in the claims.

What is claimed is:

1. An injection blow molding machine comprising, an openable injection mold, first clamp means for opening and closing said injection mold, an openable blow mold spaced from the injection mold, second clamp means for opening and closing said blow mold, said first clamp means being mounted to a first frame member, and said second clamp means being mounted to a second frame member, aid first frame member being angularly disposed to said second frame member, said first and second frame members being mounted to a column means, said first frame member being C-shaped and said second frame member being C-shaped, whereby an injection molding force on said first clamp means when the injection mold is closed is transmitted to said first frame member and a blow molding force on said second clamp means when the blow mold is closed is transmitted to said second frame member and to said column means.

2. The injection blow molding machine of claim 1, wherein said first frame member comprises a first pair of vertically disposed members and said second frame member comprises a second pair of vertically disposed members.

3. The injection blow molding machine of claim 2, wherein said column means comprises a vertically disposed column disposed between said first pair of members and between said second pair of members.

4. The injection blow molding machine of claim 1, wherein said first frame member comprises a first pair of vertically disposed members, and said second frame member comprises a second pair of vertically disposed members wherein the first clamp means is centrally disposed between the first pair of vertically disposed members and the second clamp means is centrally disposed between the second pair of vertically disposed members.

5. The injection blow molding machine of claim 1, wherein said first frame member comprises a first pair of vertically disposed members, and said second frame member comprises a second pair of vertically disposed members, wherein the first clamp means is centrally disposed between the first pair of vertically disposed members, and the second clamp means is centrally disposed between the second pair of vertically disposed members, and wherein the column means is disposed between the first pair of vertically disposed members and between the second pair of vertically disposed members.

6. The injection blow molding machine of claim 1, further comprising spacer means for spacing the frame members, said column means being disposed within said spacer means, and said spacer means being disposed between ends of the frame members.

7. The injection blow molding machine of claim 1, further comprising means disposed at an end of each frame member for mounting said frame members at a top portion and a bottom portion of the column means 8. The injection blow molding machine of claim 2, further comprising top portion plate means for mounting the first pair of vertically disposed members together, each plate means being formed with a hole for receiving the column means.

9. The injection blow molding machine of claim 1, further comprising an indexable table having core rods extending outwardly therefrom, said table being disposed between the first frame member and the second frame member and further comprising means for stripping blow molded articles said stripping means being disposed between the first and second frame members, whereby the core rods are indexed inn the injection mold for injection molding a parison on each core rod and the core rods with the injection molded parisons are then indexed in the blow mold for blow molding the articles, and then indexed for stripping the article.

10. The injection blow molding machine of claim 1, wherein said column means is pre-stressed.

11. An injection blow molding machine comprising, an openable injection mold, first clamp means for opening and closing said injection mold, an openable blow mold spaced from the injection mold, second clamp means for opening and closing said blow mold, said first mold clamp means being mounted to a first frame member and said second clamp means being mounted to a second frame member, said first frame member being angularly disposed to said second frame member, said first and second frame members being mounted to a column means, said column means mounting said frame members together, member being C-shaped and said second frame member being C-shaped, said column means being centrally disposed between said C-shaped frame members, whereby an injection molding force on said first clamp means when the injection mold is closed is transmitted to said first frame member and a blow molding force on said second clamp means when the blow mold is closed is transmitted to said second clamp means when the blow mold is closed is transmitted to said second frame member and to said column means.

12. The injection blow molding machine of claim 11, said column means comprising a column member, each said frame member comprising two vertically disposed members, wherein said column member is disposed between the two vertically disposed members of each frame member.

13. The injection blow molding machine of claim 11, wherein the column means is disposed at an open end of each frame member.

14. The injection blow mold machine of claim 11, wherein the frame member are cooperatively mounted to each other at an open end of each frame member.

* * * * *